(12) United States Patent
Zhu et al.

(10) Patent No.: US 11,301,791 B2
(45) Date of Patent: *Apr. 12, 2022

(54) FULFILMENT MACHINE FOR OPTIMIZING SHIPPING

(71) Applicant: INTERNATIONAL BUSINESS MACHINES CORPORATION, Armonk, NY (US)

(72) Inventors: Yada Zhu, Westchester, NY (US); Xuan Liu, Yorktown Heights, NY (US); Brian Leo Quanz, Yorktown Heights, NY (US); Ajay Ashok Deshpande, White Plains, NY (US); Ali Koc, White Plains, NY (US); Lei Cao, Worcester, MA (US); Yingjie Li, Chappaqua, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 163 days.

This patent is subject to a terminal disclaimer.

(21) Appl. No.: 16/005,166

(22) Filed: Jun. 11, 2018

(65) Prior Publication Data
US 2019/0378070 A1 Dec. 12, 2019

(51) Int. Cl.
*G06Q 10/06* (2012.01)
(52) U.S. Cl.
CPC ..... *G06Q 10/06315* (2013.01); *G06Q 10/067* (2013.01)
(58) Field of Classification Search
None
See application file for complete search history.

(56) References Cited

U.S. PATENT DOCUMENTS

| 8,386,298 B2 | 2/2013 | Bai et al. |
| 8,972,564 B1 * | 3/2015 | Allen ............... G06F 11/008 |
| | | 709/224 |

(Continued)

FOREIGN PATENT DOCUMENTS

WO    WO-2017217957 A1 * 12/2017 ............. G06F 30/20

OTHER PUBLICATIONS

Sheikholeslami et al. "Progressive Latin Hypercube Sampling: An Efficient Approach for Robust Sampling-Based Analysis of Environmental Needs." Environmental Modelling and Software, 93, 109-126, Jul. 2017.*

(Continued)

*Primary Examiner* — Susanna M. Diaz
(74) *Attorney, Agent, or Firm* — Intelletek Law Group, PLLC; Gabriel Daniel, Esq.

(57) ABSTRACT

A computer implemented method and system of setting values of parameters of nodes in an omnichannel distribution system, the method comprising is provided. Input parameters are received from a computing device. Historical data related to the network of nodes is received from a data repository. A synthetic scenario is determined based on the received input parameters and the historical data. Each node is clustered into a corresponding category. For each category of nodes, key parameters are identified. A range of each key parameter is determined based on the synthetic scenario. A number of simulations N to perform with data sampled from the synthetic scenario within the determined range of each key parameter is determined. For each of the N simulations, a multi-objective optimization is performed to determine a cost factor of the parameter settings. The parameter settings with a lowest cost factor are selected.

18 Claims, 7 Drawing Sheets

(56) References Cited

U.S. PATENT DOCUMENTS

| | | | |
|---|---|---|---|
| 9,213,953 B1 | 12/2015 | Kassmann et al. | |
| 9,336,302 B1* | 5/2016 | Swamy | G06F 16/355 |
| 9,501,613 B1* | 11/2016 | Hanson | G16H 40/67 |
| 2003/0061125 A1 | 3/2003 | Hoffman et al. | |
| 2007/0087756 A1* | 4/2007 | Hoffberg | G06Q 30/0201 |
| | | | 455/450 |
| 2008/0028409 A1* | 1/2008 | Cherkasova | G06F 9/5061 |
| | | | 718/104 |
| 2008/0288312 A1* | 11/2008 | Miles | G06Q 30/02 |
| | | | 705/7.34 |
| 2008/0306785 A1 | 12/2008 | Schuler et al. | |
| 2010/0317420 A1* | 12/2010 | Hoffberg | G07F 17/323 |
| | | | 463/1 |
| 2011/0054869 A1* | 3/2011 | Li | G06F 30/20 |
| | | | 703/10 |
| 2011/0307438 A1* | 12/2011 | Fernández Martínez | |
| | | | G06N 7/005 |
| | | | 706/52 |
| 2012/0072423 A1* | 3/2012 | Morrison | G06F 11/3466 |
| | | | 707/739 |
| 2012/0317059 A1 | 12/2012 | Joshi | |
| 2013/0246986 A1* | 9/2013 | Kuo | G06F 30/367 |
| | | | 716/106 |
| 2014/0052677 A1* | 2/2014 | Wagner | G06N 5/003 |
| | | | 706/13 |
| 2015/0120368 A1 | 4/2015 | Agrawal et al. | |
| 2015/0186819 A1* | 7/2015 | Patel | G06Q 10/06375 |
| | | | 705/7.37 |
| 2015/0379430 A1 | 12/2015 | Dirac et al. | |
| 2016/0055452 A1* | 2/2016 | Qin | G06Q 30/0205 |
| | | | 705/7.31 |
| 2016/0063419 A1* | 3/2016 | Martinez | G06Q 10/06315 |
| | | | 705/7.25 |
| 2016/0110681 A1 | 4/2016 | Brereton et al. | |
| 2016/0328674 A1* | 11/2016 | Tripathi | G06Q 30/0635 |
| 2016/0328781 A1* | 11/2016 | Patel-Zellinger | |
| | | | G06Q 30/0635 |
| 2017/0032016 A1* | 2/2017 | Zinner | G06Q 10/063 |
| 2017/0161614 A1 | 6/2017 | Mehta | |
| 2017/0206541 A1 | 7/2017 | Deshpande et al. | |
| 2017/0206589 A1 | 7/2017 | Deshpande et al. | |
| 2017/0323250 A1* | 11/2017 | Lindbo | G06Q 30/0621 |
| 2018/0075401 A1* | 3/2018 | Harsha | G06Q 30/0202 |
| 2018/0137415 A1* | 5/2018 | Steinberg | G06N 3/08 |

OTHER PUBLICATIONS

Rumsey, Deborah J. "How Sample Size Affects Standard Error." From the book "Statistics for Dummies, 2nd Edition." Last Updated on Mar. 26, 2016. Retrieved from {URL: https://www.dummies.com/article/academics-the-arts/math/statistics/how-sample-size-affects-standard-error-169850}. (Year: 2016).*

List of IBM Patents or Applications Treated as Related.

Cioppa, T. M. et al., "Efficient Nearly Orthogonal and Spece-Filling Latin Hypercubes"; Technometrics (2007); vol. 49:1; pp. 45-56.

Liu, X. et al., "Real Time Omni-Channel Fulfillment Optimization"; International Business Machines Corportion (xxxx) 51 pgs.

Mell, P. et al., "The NIST Definition of Cloud Computing" National Institute of Standards and Technology, Gaithersburg, MD, USA (2011); 7 pgs.

Schulte, M. J. et al. "A Variable-Precision Interval Arithmetic Processor"; Proceedings of IEEE International Conference on Application Specific Array Processors (ASSAP'94); pp. 248-258 (Year: 1994).

* cited by examiner

US 11,301,791 B2

FULFILMENT MACHINE FOR OPTIMIZING SHIPPING

BACKGROUND

Technical Field

The present disclosure generally relates to simulators, and more particularly, to modeling behavior of a networked system.

Description of the Related Art

Today, retailers use a larger number and different types of nodes to distribute and position their inventory, by way of allocation planning. In some scenarios, an omnichannel supply chain model is used for a central stock pool to control various factors, such as fulfillment, pricing, sales, ordering, and stock management. Omnichannel retailing provides a seamless customer experience across all possible touch points and locations for a product, including brick stores, catalogs, online, mobile, and social. To maintain such experience at a low cost to the retailer, optimization based fulfillment strategies have emerged in the market. Such strategies model fulfillment into a multi-dimensional optimization problem by taking into account various factors that contribute to the fulfillment costs. These fulfillment strategies offer retailers an opportunity to reduce the fulfillment cost.

SUMMARY

According to various exemplary embodiments, a computing device, a non-transitory computer readable storage medium, and a computer implemented method of setting values of parameters of nodes of an omnichannel distribution system, are provided. Input parameters are received from a computing device. Historical data related to the network of nodes is received from a data repository. A synthetic scenario is determined based on the received input parameters and the historical data. Each node is clustered into a corresponding category. For each category of nodes, key parameters are identified. A range of each key parameter is determined based on the synthetic scenario. A number of simulations N to perform with data sampled from the synthetic scenario within the determined range of each key parameter is determined. For each of the N simulations, a multi-objective optimization is performed to determine a cost factor of the parameter settings. The parameter settings with a lowest cost factor are selected.

In one embodiment, the data sampled from the synthetic scenario within the determined range of each key parameter is obtained by applying Orthogonal Latin Hypercube Sampling (OLHS) on the synthetic scenario based on the key parameters.

In one embodiment, the determination of the synthetic scenario includes creating a synthetic demand status data based on the historical data and the input parameters. The determination further includes creating a synthetic network status data based on the historical data, the input parameters, and the synthetic demand status.

In one embodiment, the determination of the number of simulations N to perform is based on: (i) a time limit for the N simulations and/or (ii) a predetermined accuracy for the simulations.

In one embodiment, the cost factor is based on: (i) a fulfillment cost for a predetermined time period, and/or (ii) a capacity utilization of the omnichannel distribution system for the predetermined time period.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
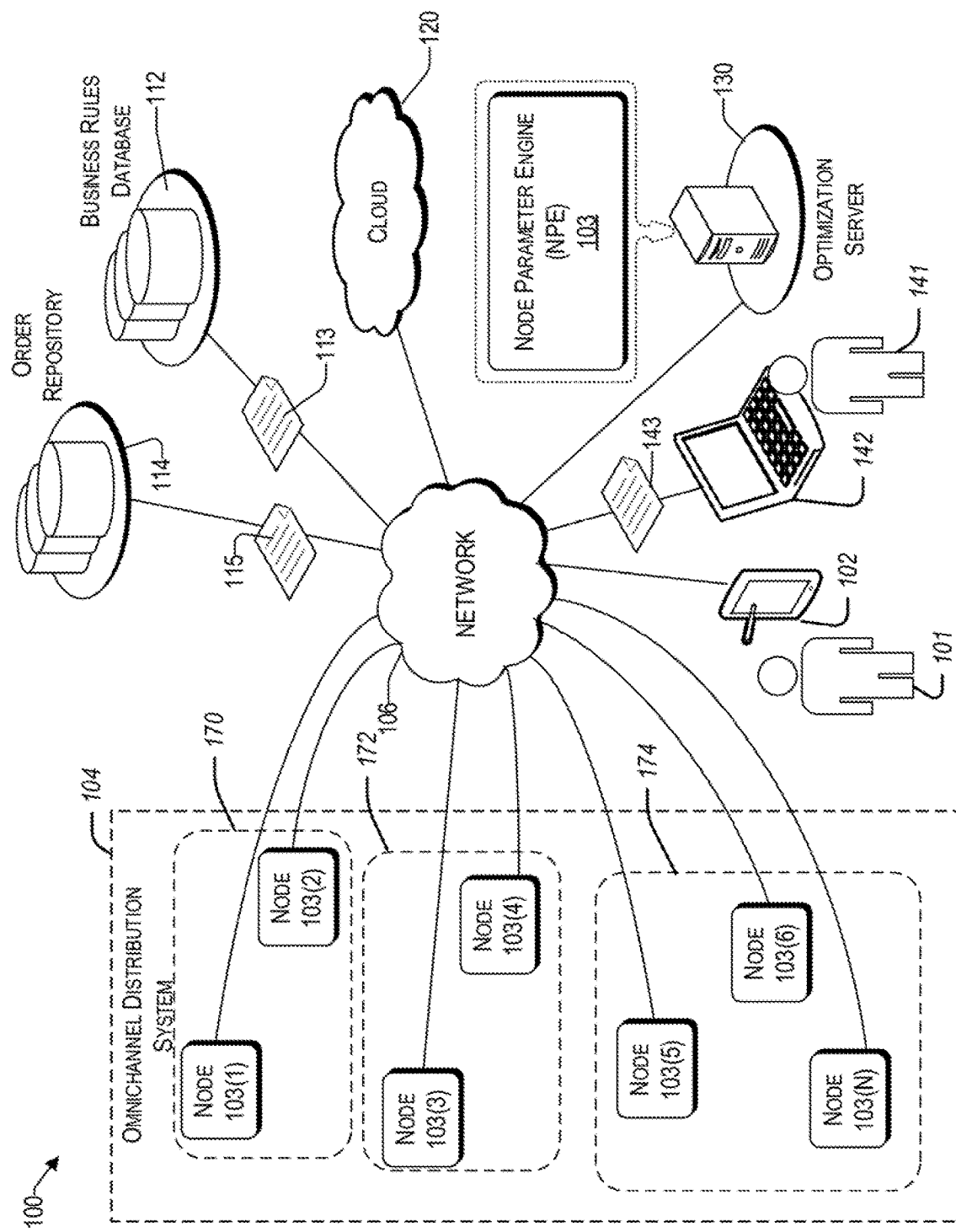
FIG. 1 illustrates an example architecture that may be used to implement a system for setting node parameters for multi-objective optimization.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure relates to modeling and optimizing the behavior of a networked system having a plurality of nodes, based on predetermined criteria. As used herein, a node is a retail store, warehouse, fulfillment center, clearance center, and the like. In view of the increasing competition from online retailers, and for enabling an omnichannel customer experience, retailers have begun using different options, such as ship from store, same day delivery, ship from various locations, and/or buy online and pickup in store. Such flexible approach involves many variables for a computing system to accommodate. To create an omnichannel experience, retailers strive to meet different competing business objectives such as minimizing shipping costs, avoiding markdowns, maximizing customer satisfaction, and reducing workloads at the nodes of the retail enterprise.

Today, retail chains offer a plethora of products that are to be distributed via different nodes and locations. Predictions of life-cycle demand are typically noisy in that it they are prone to relatively high error. Simply allocating to mean demand predictions can inordinately increase ecommerce fulfillment cost and lost store sales over the selling season of a product. There are incremental costs incurred due to over-allocating at a location (e.g., excess inventory occupies space, prices are marked down, fulfilling long-distance ecommerce orders can be expensive, labor costs increase with increased shipments, etc.) as well as due to under-allocating (e.g., lost brick sales opportunities).

To meet rapidly growing e-commerce demand and expectations, retailers are increasingly shifting to an omni-channel fulfillment approach—i.e., using all nodes in their fulfillment network, including brick-and-mortar stores, to fulfill online orders. This leads to new challenges as fulfillment networks now have potentially thousands of different, diverse nodes, and multiple, conflicting business objectives to consider when deciding how to fulfill an order, such as minimizing shipping cost, balancing load across the network and avoiding markdowns. The known solutions are typically not scalable, flexible, or capable enough to meet retailers' needs, and often end up in sub-optimal solutions only partially addressing a subset of the business objectives.

The teachings herein provide a computerized system that is configured to evaluate and compare the performance of different fulfillment strategies by adjustment of parameters in a virtual simulated environment. The fulfillment strategies for the network of nodes are optimized while balancing multiple conflicting objectives such as minimizing shipping cost, balancing network load, minimizing labor cost, and avoiding markdowns and stock-outs.

To that end, a synthetic scenario is determined based on received input parameters and historical data. Each node in an omnichannel distribution system is clustered into a corresponding category of a plurality of categories, based on one or more node features of the node. For each category of nodes, key parameters and a range thereof are identified. A number of simulations and multi-objective optimization are performed to determine a cost factor of the different parameter settings. For each category, the parameter settings with a lowest cost factor are then selected.

By virtue of the teachings herein, the computerized system can create various prospective fulfillment models that can accurately forecast different scenarios and optimize the settings of the parameters of each category of nodes for the scenario. The architecture improves computational efficiency by reducing the samples in the memory of the one or more computing devices to ones that are deemed to be statistically relevant for the calculations to be performed. Reference now is made in detail to the examples illustrated in the accompanying drawings and discussed below.

FIG. 1 illustrates an example architecture 100 that may be used to implement a system for setting node parameters for multi-objective optimization. Architecture 100 includes an omnichannel distribution system 104 having a network of nodes 103(1) to 103(N) that may be used to distribute various products. The nodes of the omnichannel distribution system 104 may include various brick and mortar stores that may be at different locations, referred to herein as zones. For example, node 103(1) may be in New York, while node 102(2) may be in Los Angeles. In various embodiments, the zones may be based at different levels of granularity and may overlap, such as countries, regions, states, zip codes, or a particular address.

The omnichannel distribution system 104 may include one or more warehouses, where products may be received from various manufacturers. For example, node 103(2) may be a warehouse that is used as a preliminary repository for a product that can then be distributed to secondary nodes, such as brick and mortar stores 103(1) and 103(2), or e-commerce warehouses 103(4), sometimes referred to as e-fulfillment centers (EFCs). Such e-fulfillment centers may be distributed in various zones to accommodate online (or catalogue) orders from users via their computing device, represented herein by customer 101 and their computing device 102.

In the omnichannel distribution system 104, a brick and mortar store, such as store 103(1), can accommodate both walk-in customers and e-commerce customers, who may be far away from the store 103(1) using a retailer initiated ship-from-store fulfillment. Accordingly, store inventory can be used to satisfy both store demand and online demand. On the other hand, warehouses and/or e-fulfillment centers have no-walk in customers and cater predominantly to online demand.

To reduce fulfillment cost and provide better customer service, an e-fulfillment center is ideally located within a convenient shipping distance from the purchase destination of a product that has been ordered online by way of a computing 102 of a customer 101. The omnichannel distribution system 104 shares inventory for a product to maximize revenue and reduce order fulfillment cost.

Each node (103(1) to 103(N)) in the omnichannel distribution system 104 generates raw data, that may include sales and lost sales data, such as the order number, order line number stock keeping unit (SKU) number, expected markdowns, and/or other data. This raw demand and node data may be provided to an appropriate recipient, such as an order repository 114 or the optimization server 130, over the network 106. The raw data may be received from the nodes 103(1) to 103(N) at predetermined intervals (e.g., daily, weekly, monthly, etc.), upon a trigger event (e.g., a threshold number of the product were sold), or upon request from the optimization server 116.

Each node (103(1) to 103(N)) belongs to a cluster of nodes in a corresponding category. In different embodiments, a category may be based on a node type (e.g., retail store, warehouse, fulfillment center, clearance center, etc.), region (e.g., zip code), accessibility (e.g., proximity to different types of transportation), etc. In the example of FIG. 1, nodes 103(1) and 103(2) are in a first category 170. Nodes 103(3) and 103(4) are in a second category 172. Nodes 103(5) to 103(N) are in a third category 174.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with an order repository 114. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users.

The order repository 114 is configured to store historical data related to orders and fulfillment by way of the omnichannel distribution system 104 (sometimes referred to herein as a network of nodes) for different time periods. Accordingly, historical data may include raw data regarding orders, which may be received from user devices (e.g., 102) at a time of order. Historical data may also include node network status data, which may be received from the network of nodes 103(1) to 103(N). The historical data 115 of the order repository 114 can be provided to the optimization server 130 at predetermined intervals or upon a trigger event (e.g., request from the optimization server 130).

The architecture 100 may include a business rules database 112 that has stored therein service level agreements (SLAs) that define commitments that prevail between a service provider associated with the network of nodes 103 (1) to 103(N) and an account of the customer 101. The business rules database 112 can provide the SLA 113 such that it is coupled with each order of a customer 101. The SLA 113 may also be used by the optimization server 130 to interpret an SLA code provided in the context of an order. The business rules database 112 may also be a source of key parameters of different categories of nodes, sometimes referred to herein as clusters. Key parameters may include, without limitation, a maximum dollar amount for shipping per order, a penalty cost of over-capacity, a capacity threshold at which a penalty is added for exceeding an identified risk, etc.

The architecture 100 includes a node parameter engine (NPE) 103, which is a program that runs on the optimization server 130. The NPE 103 is configured to receive historical data 115 from the order repository 114, input parameters from an administrator (sometimes referred to herein as a user) 141 via their computing device 142, and business rules 113 from the business rules database 112. In various embodiments, input parameters may be received in a single data packet or in several data packets by way of interactive communication between the NPE 103 and the computing device 142.

Based on the historical data 115 and the input parameters 143, the NPE 103 is configured to identify a synthetic demand and a synthetic node network status, which together provide a synthetic scenario, discussed in more detail later. This synthetic scenario can be used to determine a prospective cost, sometimes referred to herein as a cost factor, based on different settings of the parameters of a category. In this way, different global parameters for clusters can be evaluated and the cost factors provided on a user interface of the computing device 142 of the user 141.

In one embodiment, machine learning is used by the NPE 103 to learn from the historical data 115 to develop the synthetic scenario. Machine learning is used herein to construct algorithms that can learn from and make predictions based on the historical data 115 stored in the order repository. Such algorithms operate by building a model from stored prior inputs or baselines therefrom to make data-driven predictions or decisions (or to provide threshold conditions to indicate a demand data and/or network status data), rather than following strictly static criteria.

Based on the machine learning, patterns, trends, and signatures of the demand status and network status are identified and combined with the user input parameters to create a synthetic scenario. In various embodiments, the machine learning discussed herein may be supervised or unsupervised. In supervised learning, the NPE 103 may be presented with example historical data 115 from the order repository 114 as being representative of different conditions of the omnichannel distribution system 104 and/or the orders. Put differently, the historical data 115 acts as a teacher for the NPE 103. In unsupervised learning, the order repository 114 does not provide any labels as what is acceptable; rather, it simply provides raw historical data 115 to the NPE 103 that can be used together with the input parameters from the computing device 142 to find its own structure among the data. In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

The NPE 103 is configured to identify key parameters of each cluster of nodes in a category. For example, for a first category 170, labor cost may be high, so the number of employees is one of the key parameters. In a second category 172, there may be much product throughput, so the number of truck loading docks is one of the key parameters, and so forth. Each parameter may have a range (e.g., 1 to 50 employees, 1 to 10 truck loading docks, etc.). Accordingly, the combination of values for the different relevant parameters for a cluster of nodes may be a large number. To reduce the computational load, the NPE 103 is configured to determine a number of simulations (N) to perform. The number N may be based on computational resources and/or the accuracy desired. For example, the number N may be limited to a predetermined time limit to come to a conclusion based on the computational resources available to the optimization server 130. Accordingly, the NPE 103 determines how long a simulation would take P. The NPE 103 then divides the allocated time (i.e., time limit) by P. In this way, the computing resources and energy cost of preforming the N simulations is limited.

For purposes of discussion, different computing devices (e.g., 102 and 142) appear in the drawing, to represent some examples of the devices that may be used to place orders, provide input parameters, receive various notifications from the NPE 103, etc. Today, computing devices typically take the form of tablet computers, laptops, desktops, personal digital assistants (PDAs), portable handsets, smart-phones, and smart watches, although they may be implemented in other form factors, including consumer, and business electronic devices.

While the order repository 114, business rules database 112, and optimization server 130 are illustrated by way of example to be on different platforms, in various embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage, discussed in more detail later. Thus, the functionality described herein with respect to each of the order repository 114, business rules database 112, and optimization server 130 can also be provided by one or multiple different computing devices.

Figure 2:
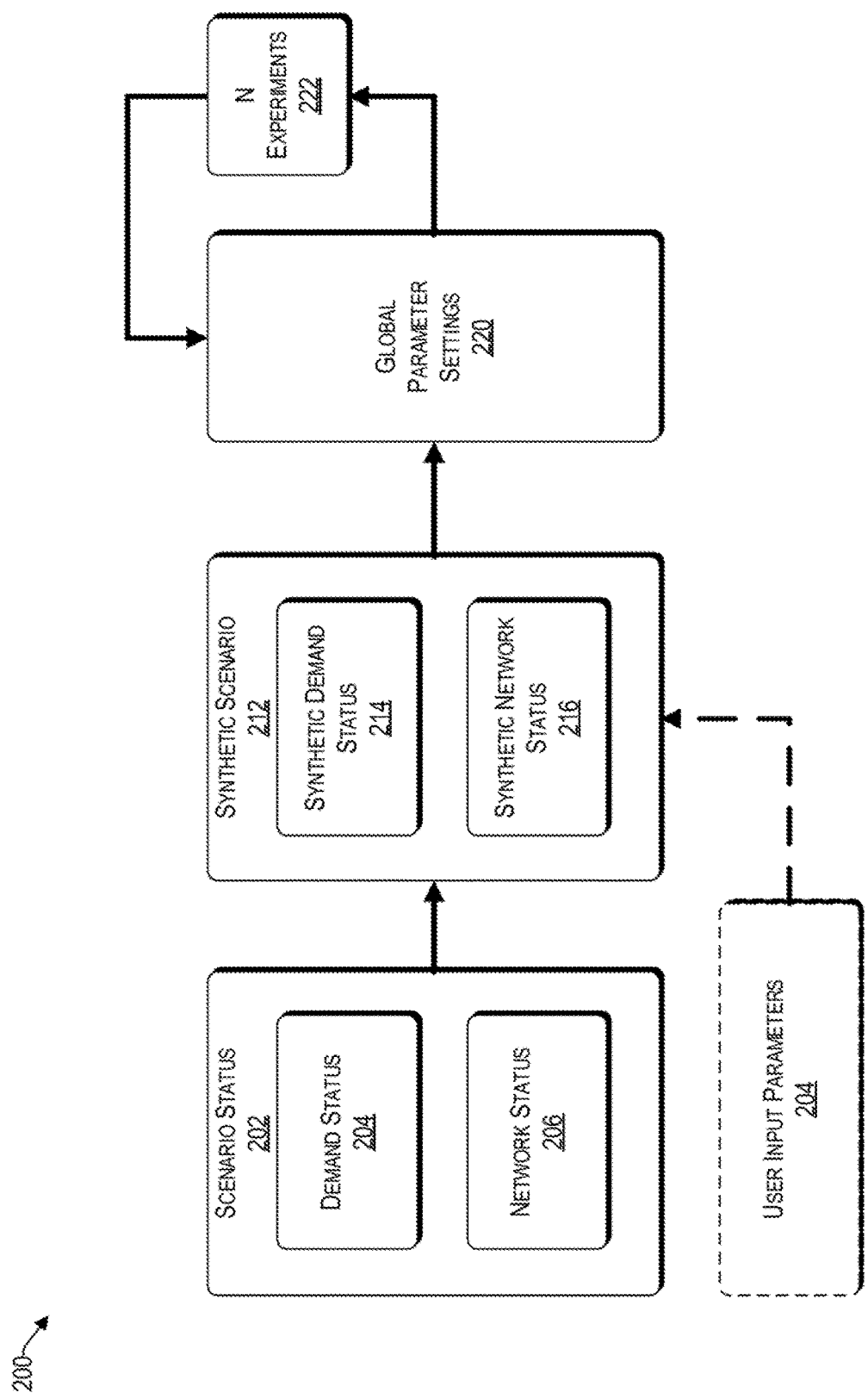
FIG. 2 is a block diagram of a system for setting node parameters for a cluster of nodes of an omnichannel network of nodes, consistent with an illustrative embodiment.

FIG. 2 is a block diagram of a system 200 for setting node parameters for a cluster of nodes of an omnichannel network of nodes, consistent with an illustrative embodiment. For discussion purposes, the block diagram of FIG. 2 is described with reference to the architecture 100 of FIG. 1.

The scenario status 202 comprises the demand status 204 and the network status 206. The demand status 204 represents raw data related to the orders of one or more products offered by the network of nodes of the omnichannel distribution system 104. Such data may include the order number, order line number, SKU number, order creation time, order process time, source location (e.g., ZIP), destination location (e.g., ZIP), fulfillment node, unit number, carrier mode, shipping cost, service level agreement (SLA) identification code or name, and the like. This raw order data is for a predetermined period (e.g., time, day, week, month, year, etc.) and is received by the order repository 114 for storage as demand status information 204.

The network status 206 represents raw data related to the condition of the network of nodes for the same predetermined period. This raw data of the node network includes a number of lines per package, weight of package, type of shipment, cost of shipment, number of shipments per order, buy quantity, prepack data, basket purchase information, proximity to a transportation hub, labor cost, and the like. This raw data of the node network, sometimes referred to herein as the omnichannel distribution system 104, is also received by the order repository 114 for storage as network status information 206. In various embodiments, the demand status can be determined before, after, or concurrently with the network status.

The raw information provided by the scenario status 202 is retrospective and therefore may or may not provide the scenario envisioned by a user (e.g., by way of the user input parameters 204), which may describe a scenario that is prospective (or different in other ways). For example, a user may be interested in different fulfillment strategies of a prospective scenario, such as a future super-bowl, a seasonal event, hypothetical natural phenomenon (e.g., heavy snow storm at a major distribution center). To that end, the demand status information 204 and the network status information 206 are used as a corpus of data to learn from and combined with the user input parameters to develop a synthetic scenario 212 that includes a synthetic demand status 214 and a synthetic network status 216.

More particularly, the raw data of the demand status information 204 is retrieved from the order repository 114 to create a synthetic demand status information 214 based on the user input parameters 204. Similarly, the raw data of the node network status information 206 is used to create the synthetic network status information 216 based on the user input parameters. In this way, a synthetic scenario 212 is created that accommodates the scenario envisioned by the user. The synthetic scenario can then be used by the NPE 103 to calculate the appropriate settings for key parameters of each cluster of nodes 220 of the omnichannel network of nodes, by way of a number (N) of experiments (i.e., simulations) 222 that explore different permutations of settings for the combination of parameters for each corresponding cluster.

The key performance indicators (KPIs) extracted from the synthetic scenario 212 that are related to demand for a predetermined period may include one or more of the following: a number of orders, average line per order, average units per order, average shipping zone per order, average weight per order, percentage of different product categories, percentage of different number of order-line orders, percentage of orders from different regions, etc. The KPIs extracted from the synthetic scenario 212 that are related to the network status may include one or more of the following: packages per order, cost per order, cost per package, end of day (EOD) backlog days, average cost per order-line, average package per order-line, number/percentage of upgraded orders, number/percentage of delayed orders, etc.

Figure 3:
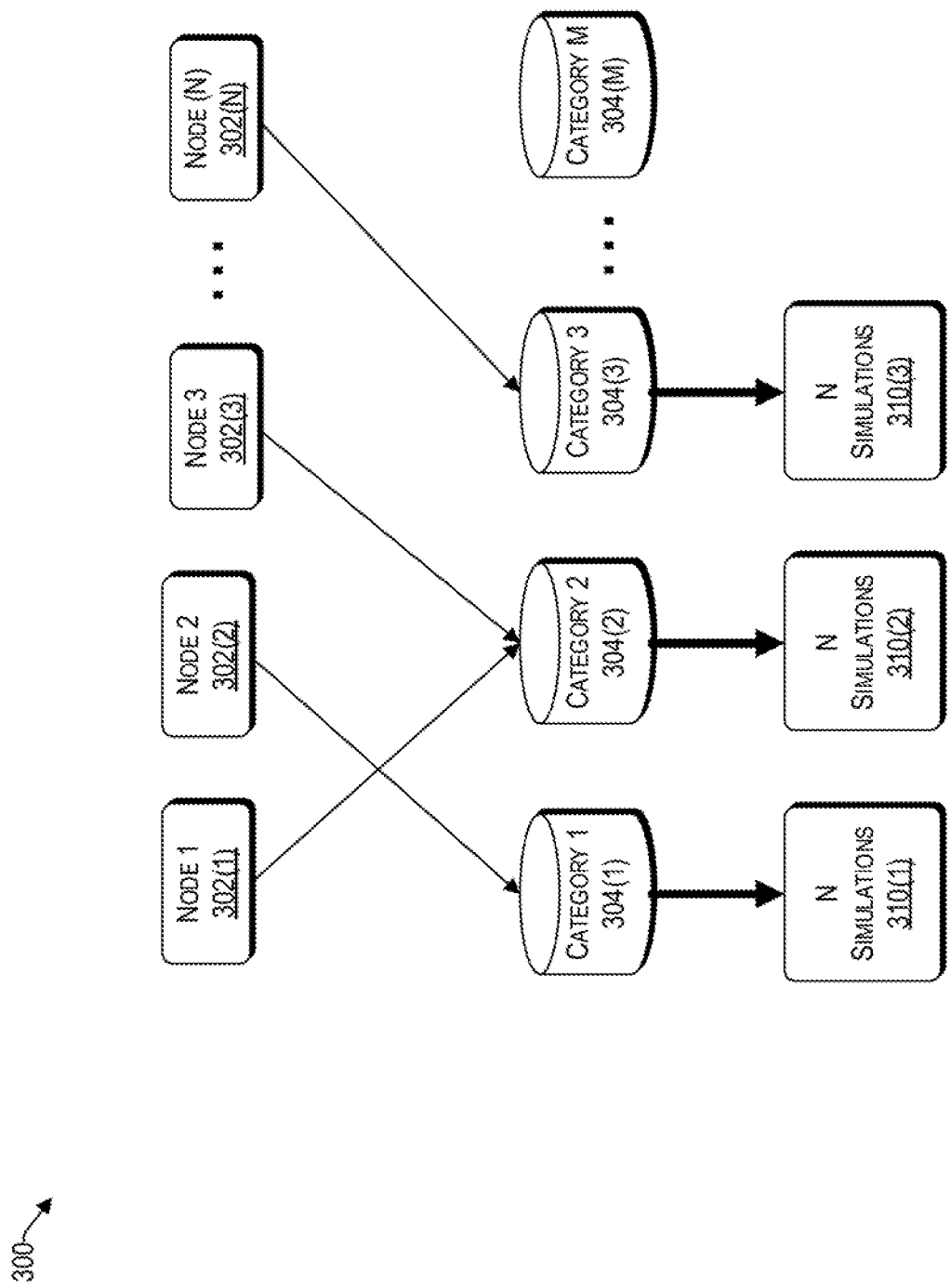
FIG. 3 is a conceptual block diagram of the clustering of each node of an omnichannel distribution system, consistent with an illustrative embodiment.

As mentioned in the context of FIGS. 1 and 2, the NPE 103 is configured to cluster each node 103(1) to 103(N) of the omnichannel distribution system 104 into a corresponding category such that each node in the category can be attributed common parameters by the NPE 103. In this regard, reference now is made to FIG. 3, which is a conceptual block diagram of the clustering of each node of an omnichannel distribution system, consistent with an illustrative embodiment.

In various embodiments, the categories 304(1) to 304(M) can be (i) predetermined or (ii) identified by the NPE 103 based on user input (which may be iterative by way of interactive communication between the user device 142 and the NPE 103). As mentioned previously, a category may be based on a node type (e.g., retail store, warehouse, fulfillment center, clearance center, etc.), region (e.g., zip code), accessibility (e.g., proximity to different types of transportation), etc. For example, all nodes that are retail stores may be clustered into category 1, all nodes that are warehouses may be clustered into category 2, all nodes that are fulfillment centers may be clustered into category 3, etc. In another example, all nodes that are in zone 1 may be clustered into category 1, all nodes that are in zone 2 may be clustered into category 2, etc. Accordingly, the clustering is based on the features of each node. By virtue of clustering, the memory stack of the computing device (e.g., optimization server 130 and/or the cloud 120), and hence, the computational load on the NPE 103 is substantially reduced.

It should be noted that while more than one node can be in a same cluster (as illustrated by way of node 1(302(1)) and node 3(302(3)), which fall into cluster 2(304(2))), no node can be clustered into multiple categories. Also, not all clusters need to be populated, as demonstrated by cluster M (304(M)). It should also be noted that the number of nodes N may be different from the number of simulations N.

For each cluster, key parameters are identified. In various embodiments, the identification of key parameters is determined by way of user input or from the business rules database 112. Accordingly, the NPE 103 may interact with the business rules database 112 to determine the key parameters for each category. Alternatively, or in addition, the NPE 103 interactively communicates with the computing device 142 of the user 141 to display different parameters to choose from for the subject category. In some embodiments, each parameter has an associated weighting factor. For example, category 1 (304(1)) may have 5 key parameters (e.g., parameters A to E). Parameter A in category 1 (304(1)) may be deemed more significant, and therefore has a higher weighting factor on an appropriate scale (e.g., 9 in a scale of 1 to 10). Parameters B and C may have a smaller weighting factor (e.g., 8 in the same scale of this example). Similarly, the remaining parameters may have other appropriate weighting factors. In various embodiments, the weighting factors may be provided by the business rules database 112 or may be provided by the user via the computing device 142 (e.g., as input parameters 143).

As discussed previously, each parameter may have a different range. The range for each parameter is determined by the NPE 103 from the synthetic network status information 216 of the determined synthetic scenario 212. In one embodiment, where a full possible range is not identified in the synthetic network status information 216, the range for the parameter is extended by a predetermined factor (e.g., by one standard deviation). For example, if parameter B is identified to only be in the range of 10 to 15 in the synthetic network status information, then the range can be extended below 10 and above 15 by a predetermined function (e.g., 1 sigma) to explore a broader range in the N simulations.

For each category, the optimization of the settings of the key parameters is performed by way of multi-objective optimization. Accordingly, the parameters are optimized in view of multiple objectives to be optimized concurrently, such that the combination of settings of the parameters as a whole accommodate the objectives. For example, the objective may be a highest profit margin, a lowest fulfillment cost, a fastest market growth, etc., for a predetermined period (e.g., week, month, quarter, season, year, event, etc.). Accordingly, decisions are taken in the context of trade-offs between two or more conflicting objectives. Minimizing fulfillment cost while shortening the shipping time are examples of the multi-objective optimization.

The optimization model presented in this study minimizes both shipping and load balancing costs simultaneously in a multi-objective optimization framework, as a weighted sum of the objectives over a set of related business constraints. The underlying mathematical calculation includes assigning items in an order to nodes in the fulfillment network so that the cost of shipping packages from the assigned nodes to the customer is minimized and traded off with the cost of balancing order loads across the network. Below, a more general cost structure that includes inventory balancing, node performance and labor cost, as well as load balancing cost is provided. The notation and formulation follows.

The indices, sets, ranges are provided by the expressions below:

| | |
|---|---|
| $k \in \mathcal{K}$ | set of SKUs (also called interchangeably items, units); |
| $i \in \mathcal{I}$ | set of order fulfilment nodes (stores, EFCs, etc.,); |
| $I_k$ | $I_k \subset I$ denotes a subset of nodes from which SKU k can be sourced; |
| $K_i$ | $K_i \subset K$ denotes a subset of SKUs available at node i; |
| $c \in C$ | set of available carriers (Different shipping methods from a carrier, such as 1DAY, 2DAYS, GROUND, etc., are considered as different elements of the set.) $C_i \subset C$ denotes subset of carriers available at node i; and |
| $h \in 1 \ldots H_c$ | incremental unit weight intervals for modeling shipping cost of carrier c. |

The data is provided by the expressions below:

| | |
|---|---|
| $W_{kc}$ | billable weight of an item of SKU k for carrier c |
| $S_{ihc}$ | shipping cost of carrier c at node i for a package in weight interval h |
| $V_{ik}$ | current available inventory position of SKU k at node i |
| $D_k$ | demand for SKU k |
| $C_{ik}$ | cost of sourcing SKU k from node i |

The decision variables are provided by the expressions below:

| | |
|---|---|
| $u_{ik}$ | units of SKU k sourced from node i |
| $z_{ic}$ | binary variable for selecting carrier c at node i |
| $y_{ihc}$ | binary variable for selecting carrier c at node i at weight interval h |

The system lets $U_{ik} = \min\{V_{ik}, D_k\}$. In one embodiment, the following expressions provide the relevant constraints:

$$\min_{u,z,y} \sum_{i \in I} \sum_{c \in C_i} \sum_{h=1}^{H_c} S_{ihc} y_{ihc} + \sum_{k \in K} \sum_{i \in I_k} C_{ik} u_{ik}, \quad (1.1)$$

$$\text{s.t.} \sum_{i \in I_k} u_{ik} = \min\left\{\sum_{i \in I_k} V_{ik}, D_k\right\}, k \in K, \quad (1.2)$$

$$u_{ik} \leq U_{ik}, k \in K, i \in I_k, \quad (1.3)$$

$$\sum_{k \in K_i} W_{kc} u_{ik} \leq H_c(1 - z_{ic}) + \sum_{h=1}^{H_c} h y_{ihc}, i \in I, c \in C_i, \quad (1.4)$$

$$\sum_{k \in K} W_{kc} u_{ik} + (1 - z_{ic}) > \sum_{h=1}^{H_c} (h-1) y_{ihc}, i \in I, c \in C_i, \quad (1.5)$$

-continued $$\sum_{h=1}^{H_c} y_{ihc} = z_{ic}, i \in I, c \in C_i, \quad (1.6)$$

$$\frac{1}{\sum_{k \in K_i} U_{ik}} \sum_{k \in K_i} u_{ik} \leq \sum_{c \in C_i} z_{ic} \leq 1, i \in I, \quad (1.7)$$

$$u_{ik} \in \mathbb{Z}_+, y_{ihc} \in \{0,1\}, z_{ic} \in \{0,1\}, k \in K, i \in I_k, c \in C_i, \quad (1.8)$$
$$h \in 1 \ldots H_c.$$

For example, constraint (1.2) stipulates that the number of units of SKU k sourced is equal to its demand, or to the total availability, whichever is minimum. Constraint (1.3) is the upper bound for units of SKU k sourced at node i. Constraint (1.4) and (1.5) are for setting up the upper and lower limits of the weight intervals for carriers available at nodes. Constraint (1.6) is for providing that exactly one weight interval for a carrier is chosen if the carrier itself is chosen, and that no weight interval is chosen if the carrier is not chosen. Constraint (1.7) serves two functions: (i) Assignment of a SKU to a node forces carrier selection for the node, and also (ii) that only one carrier can be selected at a node.

Shipping cost, as modeled by (1.1 and 1.4-1.7) has two phases. First, a carrier is chosen for a node if the node receives the item assignments (1.6, 1.7). Second, based on the carrier selected, the carrier-specific item weights are added up to obtain a total package weight (1.4, 1.5). Further, an objective function places the corresponding shipping cost for the package based on the weight interval.

The item-node cost, $C_{ik}$, in the objective (1.1) is a weighted combination of various business goals, including load balancing ($LB_{ik}$), inventory balancing ($IB_{ik}$), node performance ($NP_{ik}$), and labor cost ($LC_{ik}$). Weights of business goals goal are set by the user to be between zero and one. Denoting the weights by $\lambda$, the item-node cost is provided by the expression below:

$$C_{ik} = \lambda_{LB} LB_{ik} + \lambda_{IB} IB_{ik} + \lambda_{NP} NP_{ik} + \lambda_{LC} LC_{ik}.$$

For example, load balancing can achieve a balanced workload across the stores (i.e., nodes) in the network. If any one of the nodes happens to have a high (respectively, low) capacity utilization, load balancing will discourage (respectively, encourage) assignment of units to that store. Inventory balancing provides that each node maintains just the right amount of inventory for each item. If a node has excess inventory for an item, inventory balancing will reward the assignment of the item to the node to avoid an eventual mark down situation. Contrarily, if the inventory is falling short, load balancing will penalize the assignment, to avoid a stock out situation. Node performance cost discourages stores that have proven to cause shipment cancellations in the past. Labor cost denotes labor spent for picking and packing items.

Shipping cost, as modeled by expressions (1.1 and 1.4-1.7) has two phases. First, a carrier has to be chosen for a node if the node receives item assignments (1.6, 1.7). Second, based on the carrier selected, carrier-specific item weights are added up to obtain total package weight (1.4, 1.5). Finally, objective function places the corresponding shipping cost for the package based on the weight interval.

For example, the objective function is modeled as a cost function using predictive and/or parametric modeling, and the net objective, which can be thought of as total margin, is a weighted linear combination of individual cost functions, where weights are set by the user 141 or provided by the business rules database 112. Individual objective weights provide the flexibility to activate each objective dynamically and include relative importance of different objectives. For example, some retailers view shipping cost as a hard dollar cost and markdown avoidance cost as a soft dollar cost and might desire to trade off more "soft dollars" for a single "hard dollar." In such a scenario, the NPE 103 may set the markdown avoidance cost weight at a fraction of the shipping cost weight.

For each category, to explore every possible permutation of the parameter within its respective range may be computationally demanding for the optimization server 130 and/or the cloud 120. To reduce this computational load, the NPE 103 is configured to determine a number of simulations (N) to perform. In various embodiments, the number N may be based on computational resources and/or the accuracy (i.e., resolution) desired. For example, the number N may be limited to a predetermined time limit to come to a conclusion, based on the computational resources available to the optimization server 130 and/or the cloud 120. By virtue of limiting the computation to a focused N experiments (i.e., simulations), the computational demand on the optimization server 130 (and/or the cloud 120 supporting the optimization server 130) for the determination of the values of the parameters for each category is conserved, thereby providing a more efficient computational platform.

As discussed above, the N number of simulations to determine the appropriate settings of the identified parameters for a category involve the NPE 103 using data from the synthetic scenario 212. More particularly, data from the synthetic network status 216 is used for the N simulations. Simulating with all the data included in the synthetic network status 216 for that category may be resource intensive in terms of memory, computations, and time for the optimization server 130 and/or the cloud 120. Accordingly, the data therein is sampled to provide a meaningful representation of the performance of the category of nodes with respect to its key parameters. To that end, in one embodiment, Latin Hypercube Sampling (LHS) is used for computational efficiency, wherein near-random sample of values from the multidimensional distribution of the synthetic network status data is used by the NPE 103. When sampling a function of K parameters of a cluster of nodes in a category, the range of each variable is divided into M equally probable intervals, where M sample points are used to satisfy the Latin hypercube. Thus, the number of divisions (M) is equal for each variable.

In one embodiment, Orthogonal Latin Hypercube Sampling (OLHS) is used, where the sample space of the data is divided into equally probable subspaces, sometimes referred to herein as parameters. All sample points can then be chosen simultaneously by the NPE 103, thereby providing a total collection of sample points as a Latin Hypercube sample and wherein each subspace is sampled with the same density. Accordingly, in contrast to random sampling, where sample points are generated without taking into consideration the previously generated sample points, in the OLHS performed herein, the sample space is divided into equally probable subspaces such that the sample points are each a Latin Hypercube sample and each subspace (i.e., parameter) is sampled with the same density.

Figure 4:
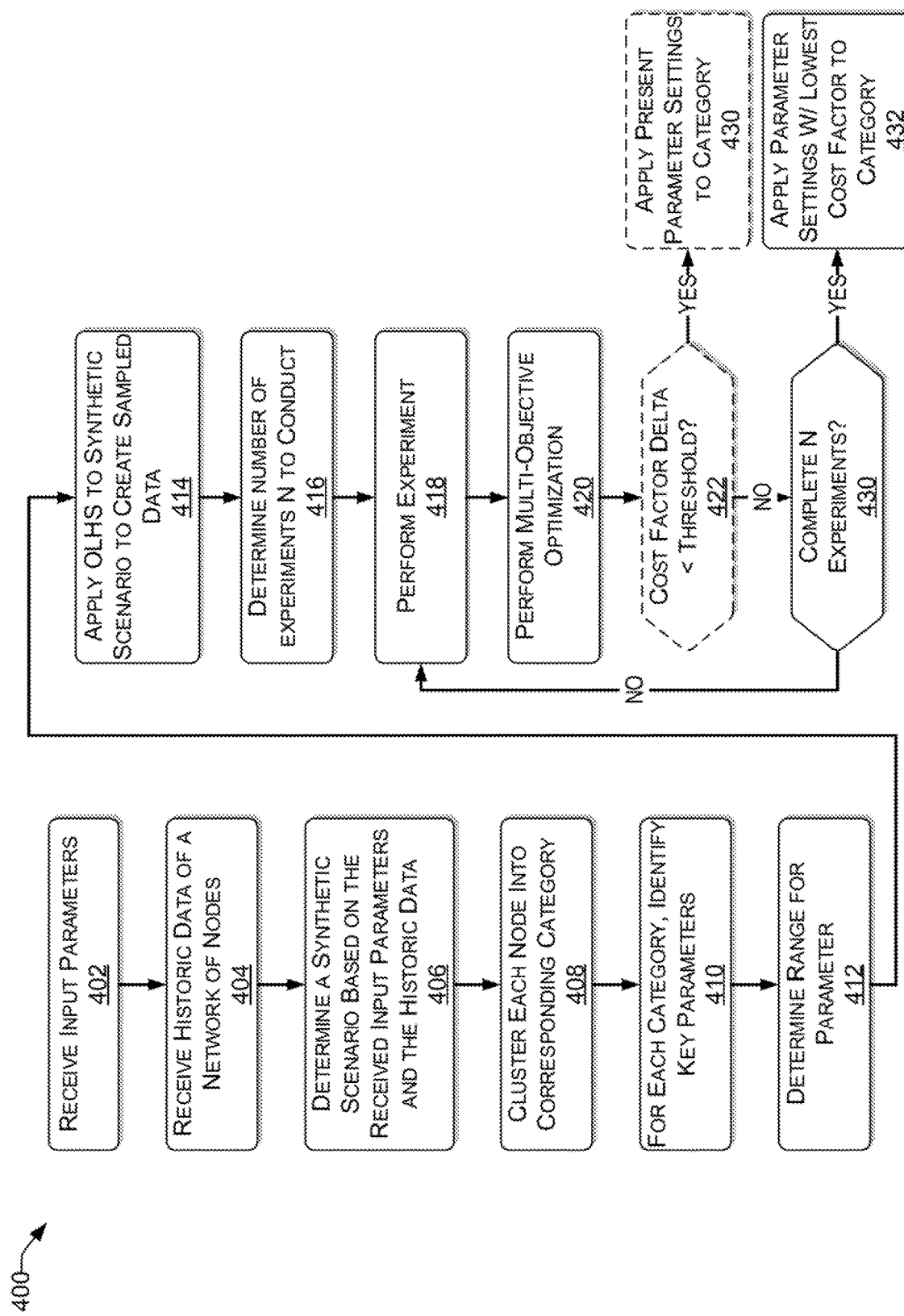
FIG. 4 presents an illustrative process for setting node parameters for a category of nodes, consistent with an illustrative embodiment.

With the foregoing overview of the architecture 100 of a system for setting node parameters for multi-objective optimization, and a discussion of a diagram of a system 200 for setting node parameters for a cluster of nodes of an omnichannel network of nodes, it may be helpful now to consider a high-level discussion of an example process. To that end, FIG. 4 presents an illustrative process 400 for setting node parameters for a category of nodes, consistent with an illustrative embodiment. This process may be performed by the NPE 103 of an optimization server 130. Process 400 is illustrated as a collection of blocks in a logical flowchart representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 400 is described with reference to the architecture 100 of FIG. 1.

At block 402, input parameters are received by the NPE 103 from the computing device 142 of a user 141. In some embodiments, the input parameters are not provided in a single data packet; rather, they are provided by way of iterative communication between the computing device and the NPE 103. For example, the user 141 may provide an initial set of parameters, which are iteratively finetuned by the NPE 103 asking interactive questions. The iterative communication may include the user being prompted one or more interactive forms that are displayed on a screen of the computing device 142, where the user can enter parameters or make binary selections from a list of options.

At block 404, historic order data 115 is received by the NPE 103 from an order repository 114 at predetermined intervals or upon a trigger event (e.g., in response to a request from the NPE 103). The historical data includes raw data of orders (i.e., demand data) of one or more products offered by the network of nodes 103(1) to 103(N) of the omnichannel distribution system 104. The historical data also includes raw data of performance parameters (i.e., network status data) of each node in the network of the omnichannel distribution system 104. In various embodiments, the raw demand data and the raw network status data may be received by the optimization server 130 separately or in the same data packet from the order repository 114.

At block 406, a synthetic scenario is identified by the NPE 103. The synthetic scenario data comprises: (i) synthetic demand based on the received input parameters and the historical data, and (ii) a synthetic network status based on the received input parameters, the historical data, and the synthetic demand status.

At node block 408, each node in the omnichannel distribution system 104 is clustered by the NPE 103 into a corresponding category of a plurality of categories. The clustering is based on one or more features of the node, such as node type, region, accessibility, etc.

At block 410, for each category (i.e., cluster of nodes), key parameters are identified by the NPE 103. The identification of the key parameters is determined from at least one of: (i) user input parameters, and (ii) from the business rules database 112.

At block 412, the NPE 103 determines a range of values for each parameter based on the synthetic scenario. For example, the synthetic network status 216 provides the minimum, maximum, median, and average values for each parameter. From this information, the NPE 103 can determine the relevant range. As mentioned previously, in one embodiment, where a full possible range is not identified from the synthetic network status information 216, the range for the subject parameter is extended by a function (e.g., by one standard deviation).

At block 414, the NPE 103 applies Orthogonal Latin Hypercube Sampling (OLHS) to the synthetic scenario data based on the identified key parameters to create sampled data.

At block 416, the NPE 103 determines a number of simulations N to perform. For example, the number N may be limited to a predetermined time limit to come to a conclusion, based on the computing resources available to the optimization server 130. In this way, the computing resources and energy cost of preforming the N simulations is managed.

At block 418, the NPE 103 performs a first simulation of the N identified simulations to determine a cost factor thereof. In other embodiments, all N identified simulations are performed concurrently, based on the available computing resources. In various embodiments, the cost factor may be based on fulfillment cost and/or capacity utilization for a predetermined time period. As used herein, capacity utilization refers to the extent to which the productive capacity of the omnichannel distribution system 104 is used with reference to its capacity. It is the relationship between a calculated expected output for the present parameter settings and the potential output which could be produced with it, if capacity was fully used. The higher the deviation from full capacity is attributed as a higher cost.

At block 420, multi-objective optimization is performed to determine a total cost factor in view of the multiple objectives for the subject category of the omnichannel distribution system 104.

In one embodiment, at block 422 the NPE 103 determines whether a delta in the cost factor is above a predetermined threshold. The delta refers to a difference between the present cost factor and a cost factor of a prior simulation of the N simulations. In one embodiment if the present simulation is a first simulation, then a large default value (e.g., 10E10) is used as a prior value, which dictates that the cost factor delta is not below the predetermined threshold. If the cost factor delta is below the predetermined threshold in subsequent iterations (i.e., "YES" at decision block 422), it is indicative that further optimization is not required and the process continues with block 432 where the settings of the present simulation are used as global values for the parameters of the subject category. In this way, the iterative loop need not further continue. Thus, even though not all of the N simulations may not have yet been performed, the simulation is stopped for the category in this embodiment, thereby saving valuable computing resources, and hence, the energy efficiency of the optimization server 130 and/or the cloud 120. However, upon determining that the cost factor delta is not below the predetermined threshold (i.e., "NO" at decision block 422), then the process continues with block 430.

At block 430, the NPE 103 determines whether all N simulations have been completed. If so (i.e., "YES" at decision block 430), the process continues with block 432, where the settings of the values of the parameters having the lowest cost function are used as global values for the parameters of the subject category.

Figure 5:
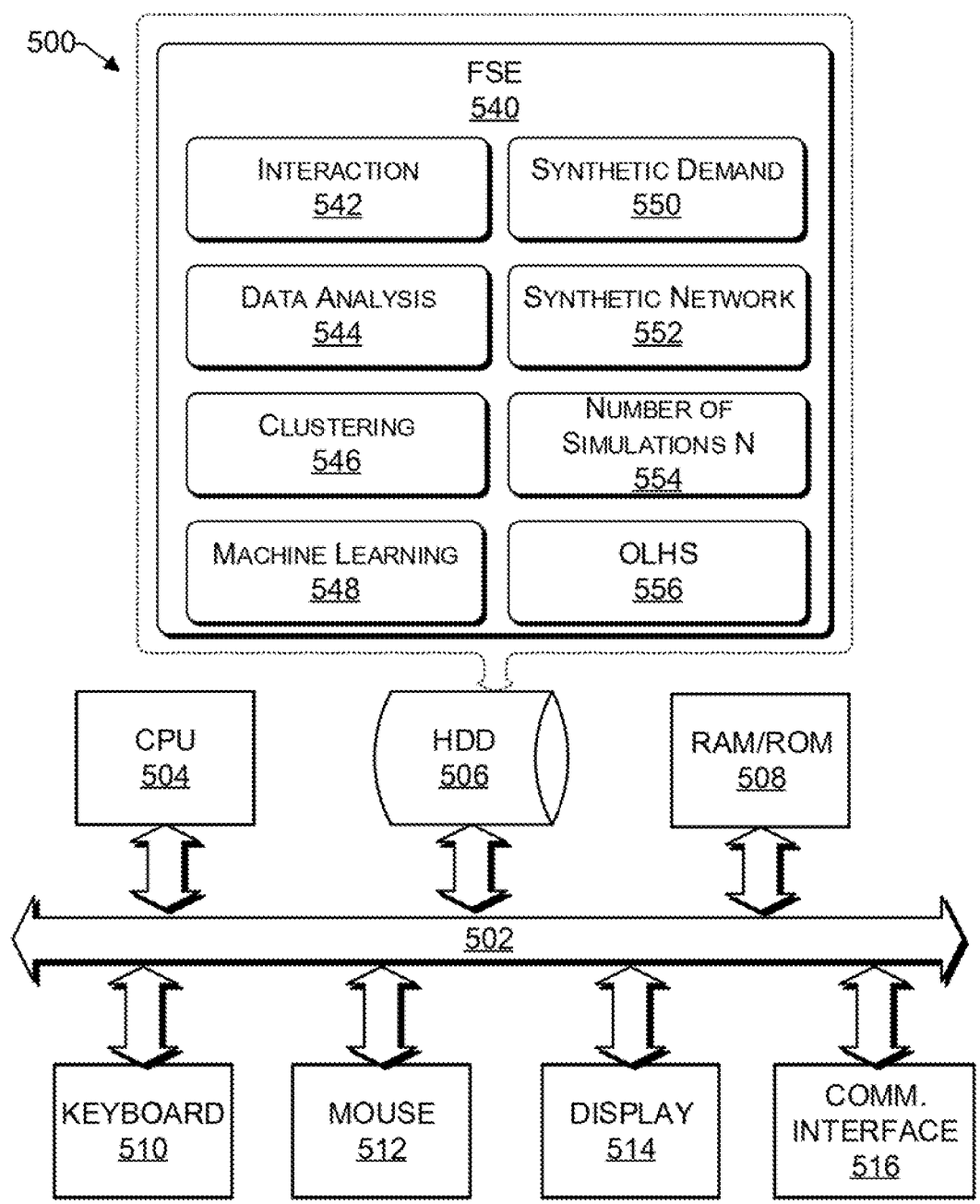
FIG. 5 provides a functional block diagram illustration of a computer hardware platform that may be used to implement the functionality of the optimization server of FIG. 1.

As discussed above, functions relating to implementing a system for setting node parameters for multi-objective optimization, can be performed with the use of one or more computing devices connected for data communication via wireless or wired communication, as shown in FIG. 1 and in accordance with the process of FIG. 4. FIG. 5 provides a functional block diagram illustration of a computer hardware platform 500 that may be used to implement the functionality of the optimization server 130 of FIG. 1.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 508, has capabilities that include storing a program that can execute various processes, such as node parameter engine (NPE) 540, in a manner described herein. The NPE 540 may have various modules configured to perform different functions to determine the setting of parameters for each cluster of nodes. For example, there may be an interaction module 542 that is operative to receive electronic data from various sources, including historical data 115 from the order repository 114, input parameters from a user device 142, business rules 113 and key parameters of different categories of nodes from a business rules database 112, and/or other data that may be in the cloud 120.

In one embodiment, there is a data analysis module 544 operative to determine a demand status and a network status of various historic scenarios. There may be a clustering module 546 that is operative to cluster nodes that have similar features into a corresponding category.

In one embodiment, there is a machine learning module 548 operative to learn from the historical data 115 to develop a synthetic scenario therefrom. There may be a synthetic demand module 550 operative to characterize a synthetic demand status based on the raw demand data and user input parameters. Similarly, there may be a synthetic network module 552 that is operative to characterize a synthetic network status based on the raw network status information, the synthetic demand status, and user input parameters.

In one embodiment, there is a module 554 operative to calculate the number of simulations N to perform, such that at that the simulations are limited to a total predetermined time and/or a predetermined accuracy.

In one embodiment, there is an Orthogonal Latin Hypercube Sampling (OLHS) module 556 operative to sample the data of the synthetic scenario for a subject category to provide a sample space that is divided into equally probable subspaces, such that the sample points are each a Latin Hypercube Sample and each subspace is sampled with the same density.

In one example a program, such as Apache™, can be stored for operating the system as a Web server. In one embodiment, the HDD 508 can store an executing application that includes one or more library software modules, such as those for the Java™ Runtime Environment program for realizing a JVM (Java™ virtual machine).

As discussed above, functions relating to determining settings of node parameters for multi-objective optimization may include a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
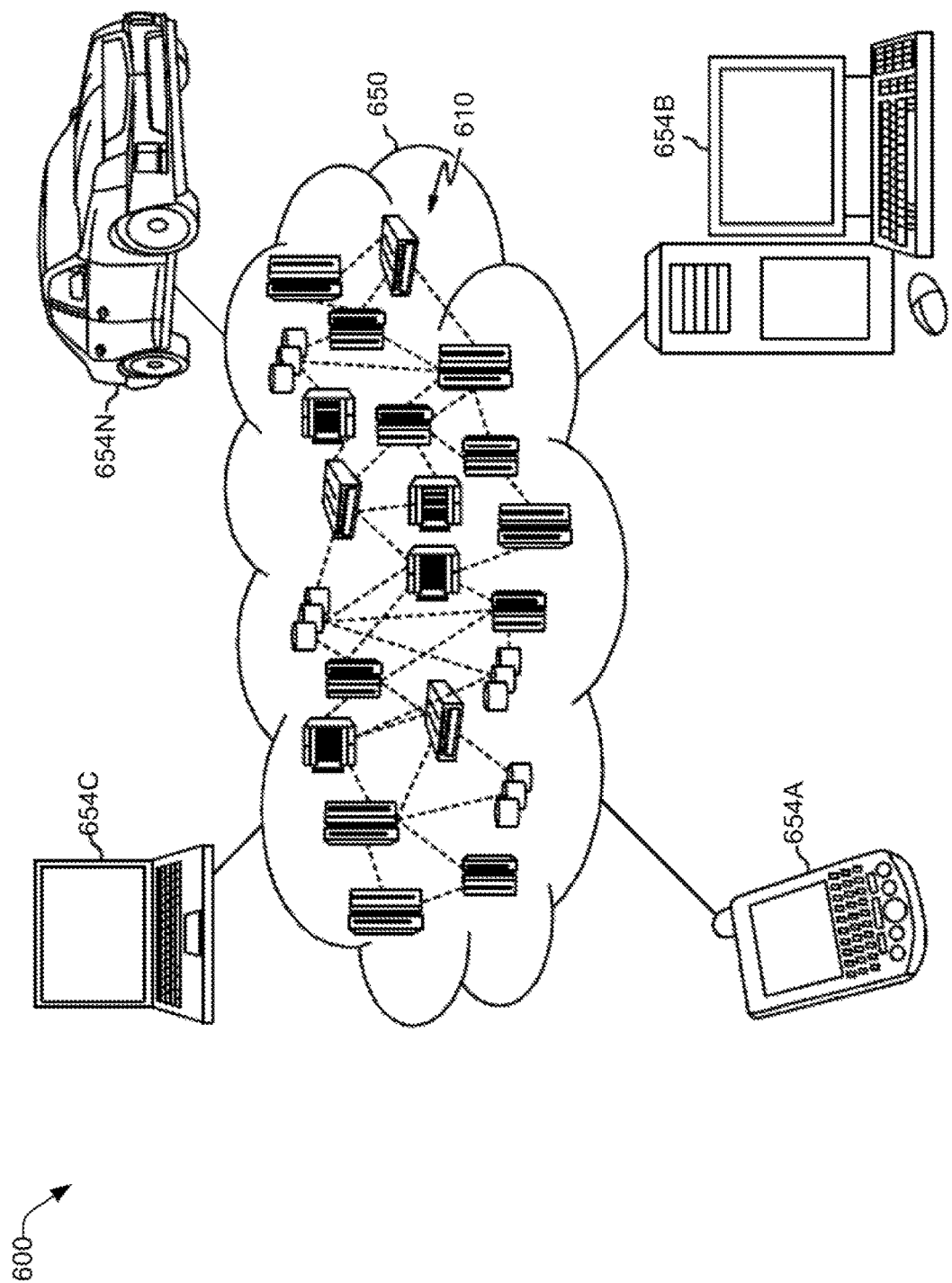
FIG. 6 depicts a cloud computing environment according to an illustrative embodiment.

Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
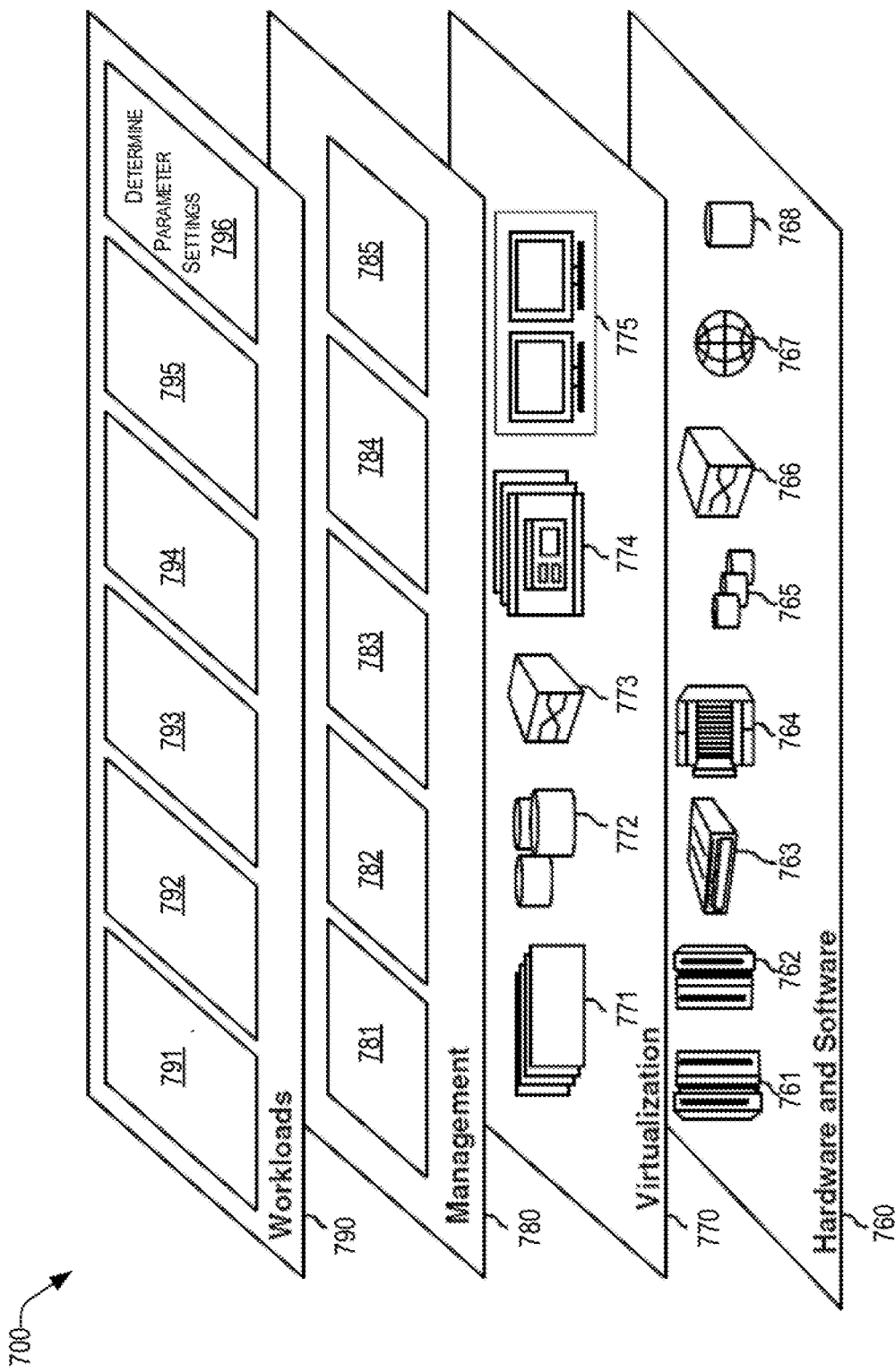
FIG. 7 depicts abstraction model layers according to an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and determining settings of parameters for nodes in an omnichannel distribution system 796.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device for content and programming coupled to the processor;
   a program stored in the storage device, wherein an execution of the program by the processor configures the computing device to perform acts comprising:
   receiving input parameters;
   receiving historical data related to a network of nodes, from a data repository;
   determining a synthetic scenario based on the received input parameters and the historical data;
   reducing a load on a memory stack of the computing device and a computational load on the processor by clustering each node into a corresponding category of a plurality of categories;
   for each category of nodes:
      identifying key parameters;
      determining a range of each key parameter based on the synthetic scenario comprising:
         determining a maximum and a minimum setting for the key parameter from a synthetic network status data;
         extending at least one of the maximum and the minimum setting by a predetermined sigma variation; and
         basing the range of the key parameter between the maximum and the minimum, including the extension by the predetermined sigma variation;
      sampling data from the synthetic scenario within the determined range of each key parameter;
      further reducing the computational load on the processor by determining a number of simulations N to perform with the data sampled from the synthetic scenario based on the range of each key parameter, a determination of a computational resources available, and a desired computing accuracy;
      for each of the N simulations, performing a multi-objective optimization to determine a cost factor of the parameter settings and storing the cost factor in the storage device; and
      selecting the parameter settings with a lowest cost factor.

2. The computing device of claim 1, wherein the data sampled from the synthetic scenario within the determined range of each key parameter is obtained by applying Orthogonal Latin Hypercube Sampling (OLHS) on the synthetic scenario based on the key parameters.

3. The computing device of claim 1, wherein determining the synthetic scenario comprises:
   creating a synthetic demand status data based on the historical data and the input parameters; and
   creating a synthetic network status data based on the historical data, the input parameters, and the synthetic demand status.

4. The computing device of claim 1, wherein:
   the historical data includes:
      raw demand data of one or more products offered by the network of nodes; and
      raw node data of each node in the network of nodes;
   the synthetic demand status is based on the raw demand data; and
   the synthetic network status is based on the raw node data.

5. The computing device of claim 1, wherein the determination of the number of simulations N to perform is based on at least one of: (i) a time limit for the N simulations, and (ii) a predetermined accuracy for the simulations.

6. The computing device of claim 1, wherein the clustering of each node into a corresponding category of a plurality of categories is based on one or more features of the node.

7. The computing device of claim 1, wherein the key parameters are identified from the input parameters.

8. The computing device of claim 1, wherein the key parameters are identified by receiving the key parameters from a business rules database over the network.

9. The computing device of claim 1, wherein the cost factor is based on at least one of: (i) a fulfilment cost for a predetermined time period, and (ii) a capacity utilization of the omnichannel distribution system for the predetermined time period.

10. The computing device of claim 1, wherein execution of the program by the processor further configures the computing device to perform acts comprising, for each category of nodes, upon determining that a delta of the cost factor between a present simulation and a prior simulation of the N simulations is below a predetermined threshold:
    identifying the present simulation as having the lowest cost factor; and
    not performing any additional simulations for the category even if all N simulations have not yet been performed.

11. The computing device of claim 1, wherein determining the synthetic scenario comprises using machine learning to learn from the historical data.

12. A non-transitory computer readable storage medium tangibly embodying a computer readable program code having computer readable instructions that, when executed, causes a computer device to carry out a method of setting values of parameters of a network of nodes in an omnichannel distribution system, the method comprising:
  receiving input parameters from a computing device of a user;
  receiving historical data related to the network of nodes, from a data repository;
  determining a synthetic scenario based on the received input parameters and the historical data;
  reducing a load on a memory and a computational load on the computer device by clustering each node into a corresponding category of a plurality of categories;
  for each category of nodes:
    identifying key parameters;
    determining a range of each key parameter based on the synthetic scenario comprising:
      determining a maximum and a minimum setting for the key parameter from a synthetic network status data;
      extending at least one of the maximum and the minimum setting by a predetermined sigma variation; and
      basing the range of the key parameter between the maximum and the minimum, including the extension by the predetermined sigma variation;
    sampling data from the synthetic scenario within the determined range of each key parameter;
    reducing the computational load on the computer device by determining a number of simulations N to perform with the data sampled from the synthetic scenario based on the range of each key parameter, a determination of a computational resources available, and a desired computing accuracy;
    for each of the N simulations, performing a multi-objective optimization to determine a cost factor of the parameter settings and storing the cost factor in the storage device; and
    selecting the parameter settings with a lowest cost factor.

13. The non-transitory computer readable storage medium of claim 12, wherein the data sampled from the synthetic scenario within the determined range of each key parameter is obtained by applying Orthogonal Latin Hypercube Sampling (OLHS) on the synthetic scenario based on the key parameters.

14. The non-transitory computer readable storage medium of claim 12, wherein determining the synthetic scenario comprises:
  creating a synthetic demand status data based on the historical data and the input parameters; and
  creating a synthetic network status data based on the historical data, the input parameters, and the synthetic demand status.

15. The non-transitory computer readable storage medium of claim 14, wherein determining the range of a key parameter comprises:
  determining a maximum and a minimum setting for the key parameter from the synthetic network status data; and
  basing the range of the key parameter between the determined maximum and the minimum settings.

16. The non-transitory computer readable storage medium of claim 12, wherein the determination of the number of simulations N to perform is based on at least one of: (i) a time limit for the N simulations, and (ii) a predetermined accuracy for the simulations.

17. The non-transitory computer readable storage medium of claim 12, wherein the cost factor is based on at least one of: (i) a fulfilment cost for a predetermined time period, and (ii) a capacity utilization of the omnichannel distribution system for the predetermined time period.

18. The non-transitory computer readable storage medium of claim 12, further comprising, for each category of nodes, upon determining that a delta of the cost factor between a present simulation and a prior simulation of the N simulations is below a predetermined threshold:
  identifying the present simulation as having the lowest cost factor; and
  not performing any additional simulations for the category even if all N simulations have not yet been performed.

* * * * *